United States Patent [19]
Sadrozinski et al.

[11] Patent Number: 6,002,930
[45] Date of Patent: Dec. 14, 1999

[54] METHOD AND APPARATUS FOR ASSIGNING PERSONALITY INFORMATION TO ROAMING MOBILE RADIOS

[75] Inventors: Peter Sadrozinski, Lynchburg; Timothy J. Doiron, Forest; Greg Graham; Christopher M. Schmidt, both of Lynchburg, all of Va.

[73] Assignee: Ericsson Inc., Research Triangle Park, N.C.

[21] Appl. No.: 08/808,845

[22] Filed: Feb. 28, 1997

[51] Int. Cl.⁶ ...................................................... H04Q 7/20
[52] U.S. Cl. ............................................ 455/432; 455/461
[58] Field of Search ...................................... 455/422, 426, 455/432, 433, 435, 445, 461, 517, 551, 552, 560, 566

[56] References Cited

U.S. PATENT DOCUMENTS

| | | |
|---|---|---|
| 5,046,082 | 9/1991 | Zicker et al. . |
| 5,101,500 | 3/1992 | Marui ...................................... 455/551 |
| 5,428,666 | 6/1995 | Fyfe et al. ............................... 455/432 |
| 5,440,614 | 8/1995 | Sonberg et al. ......................... 455/432 |
| 5,454,027 | 9/1995 | Kennedy et al. . |
| 5,457,680 | 10/1995 | Kamm et al. ............................ 455/432 |
| 5,467,381 | 11/1995 | Peltonen et al. ........................ 455/432 |
| 5,684,859 | 11/1997 | Chanroo et al. ......................... 455/433 |
| 5,724,658 | 3/1998 | Hasan ...................................... 455/432 |

FOREIGN PATENT DOCUMENTS

| | | |
|---|---|---|
| 0 512 962 | 11/1992 | European Pat. Off. . |
| 44 17 779 | 12/1995 | Germany . |
| 5-14271 | 1/1993 | Japan . |

*Primary Examiner*—Nguyen Vo
*Attorney, Agent, or Firm*—Nixon & Vanderhye P.C.

[57] ABSTRACT

A mobile radio communication system is disclosed in which personality information for a radio can be modified in order to permit the radio to roam from one broadcast region to another. Since each broadcast region is serviced by a different gateway, the radios within that region use particular personality information in order to communication with it. When the radios roam from one region to another, the radios request new personality information relevant to the destination region. Each radio uses local identification data to uniquely identify the radio within the system. When the radio roams, the gateway provides the radio with new local identification data relevant to the destination region. The local identification data for each radio in a given region is mapped by the gateway in a memory such that available local identification data can be re-assigned to radios that roam into the gateway region. Then, when the radio leaves the region, the local identification data that was given to the radio is de-allocated such that it is then available to another radio that roams into the region.

15 Claims, 4 Drawing Sheets

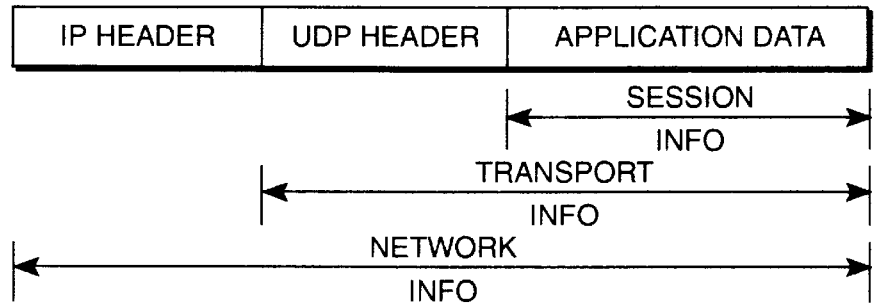
FIG. 3
PRIOR ART
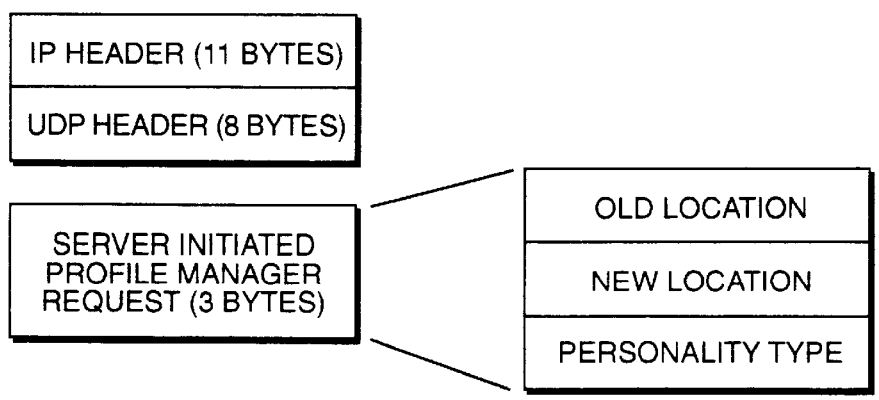
FIG. 6: RADIO SERVER INITIATED PROFILE REQUEST

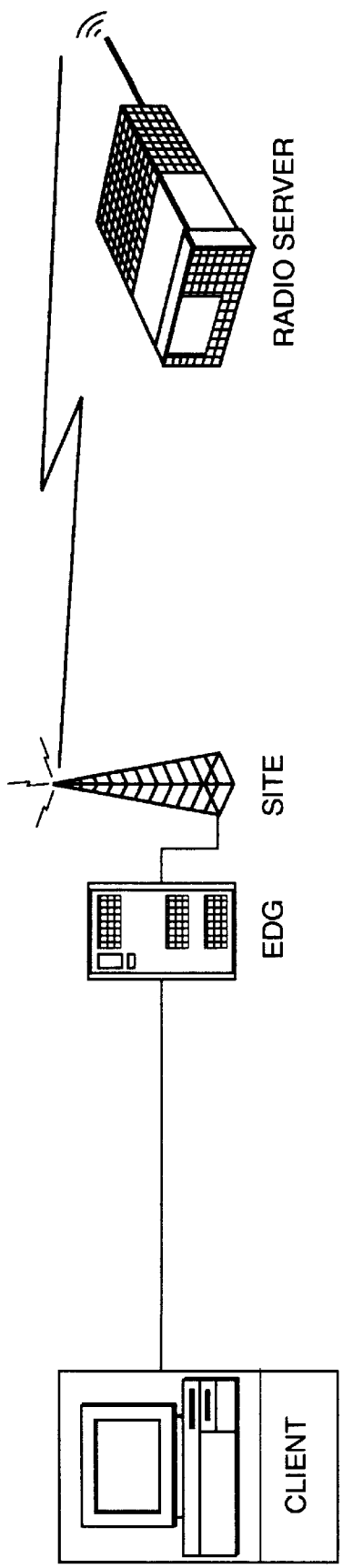
FIG. 4: CURRENT PROFILE CLIENT/SERVER ARCHITECTURE
PRIOR ART

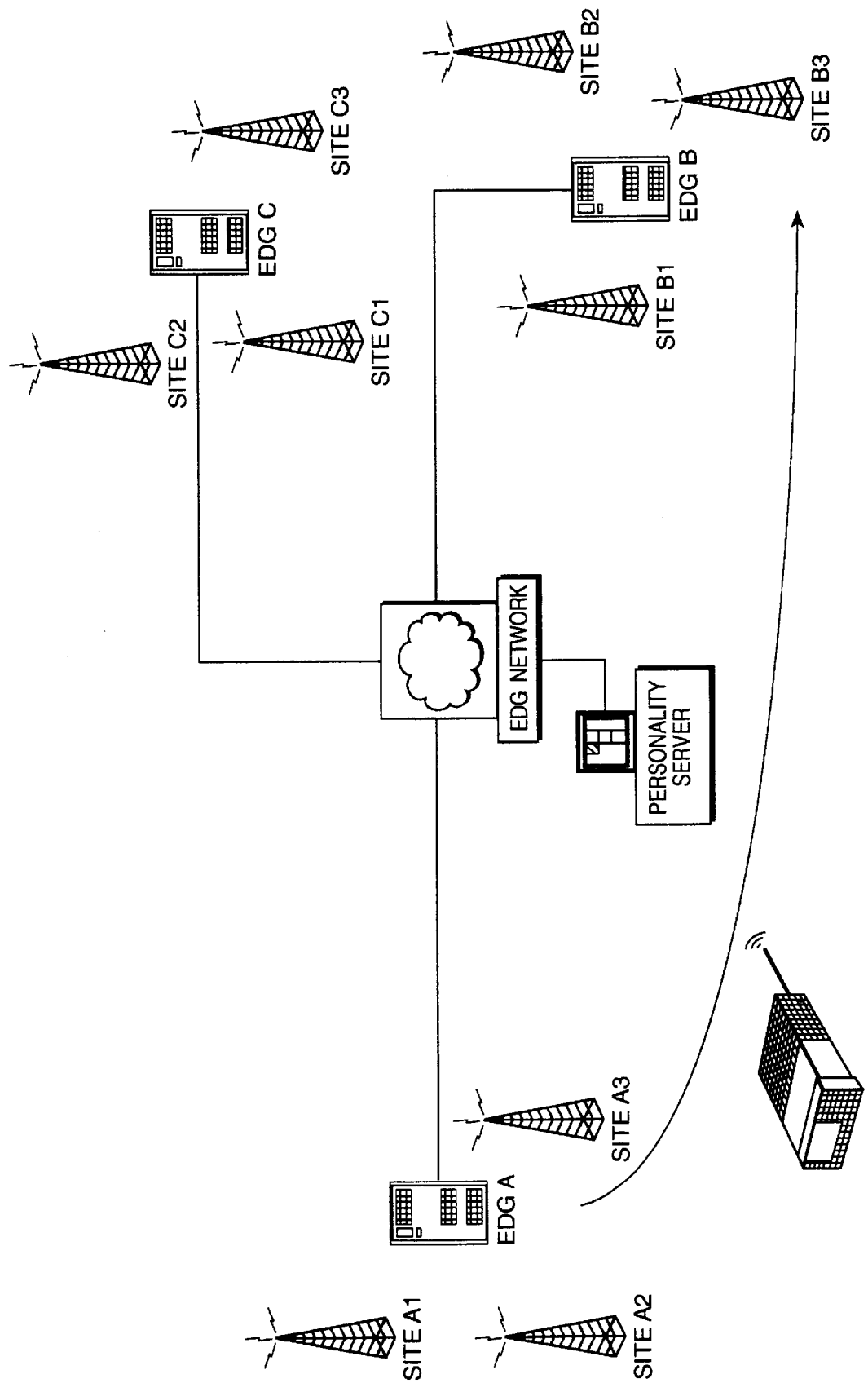
FIG. 5: DISTRIBUTED EDACS NETWORK

METHOD AND APPARATUS FOR ASSIGNING PERSONALITY INFORMATION TO ROAMING MOBILE RADIOS

FIELD OF THE INVENTION

This invention relates to communication networks, and more particularly, to methods and apparatus for assigning and re-assigning operating characteristics to mobile radios as they roam throughout a communication network.

BACKGROUND OF THE INVENTION

Communication networks for mobile radios involve protocols that coordinate the data being communicated between the radios. One such protocol follows the well-known OSI (Open Systems Interconnection) standard, in which communication tasks between networked devices are divided into manageable layers, as shown in FIG. 1. As shown in FIG. 1, the communication tasks are divided into application, presentation, session, transport, network, data link, and physical layers within each peer within the communication system. Communication data is packed and unpacked from one peer application to another by applying (or removing) headers AH, PH, SH, TH, NH, etc. to the original user data as it approaches (or leaves) the transmission media.

The present invention generally relates to the data at the transport layer. This layer is the highest level for tasks associated with the communication service provider. That is, the application layer through the session layer are associated with the data end-user and the transport through the physical layers are the responsibility of the communication service provider. As the highest layer associated with communication service, the transport layer has the ultimate responsibility for providing reliable peer to peer communication data delivery.

The transport layer protocol can follow the TCP (transport control protocol) for file transfers or the UDP (user datagram protocol) for terminal emulation applications. In either event, the network protocol (just below the transport layer) can follow the IP (Internet protocol) for transmission on the Internet or an equivalent protocol (such as ENL (EDACS Network Layer) used by Ericsson). When the above protocols are used, the data with its associated headers will appear as in FIG. 2, with application information, a TCP header and a IP header coming from, respectively, the session, transport and network layers. FIG. 3 illustrates a similar data protocol with a UDP header replacing the TCP header.

Occasionally, a communication network will employ a small number of communication managers to negotiate data traffic for a large number of remote devices. The managers are sometimes referred to as servers and the remote devices as peers. This occurs, for example, with mobile radio networks, in which a large number of remote mobile radios communicate with each other through the help of a server, as shown in FIG. 4. Mobile radios are connectionless and thus the radios broadcast their messages to and from the client via broadcast sites and gateways. In a typical mobile radio network, a city will have one or more broadcast sites connected to a network gateway that communicates with the client via wireline communications.

SUMMARY OF THE INVENTION

With the present invention, mobile radios that use the OSI standard for communication utilize a transport layer that adheres to a half-duplex transmission characteristic. As such, the connection to the radio always conforms to a client/server architecture with the radio acting as the server and a software program capable of sending radio information (such as personality information, described below) acting as the client. FIG. 5, for example, illustrates a typical mobile radio communication system, modeled after Ericsson's ProFile communication architecture.

Each of the radios has personality information stored within it that identifies the radio to a local radio site and to the client. When a radio broadcasts a message to a gateway via the site, the site knows which radio is sending the message as a result of a part of the personality information called a LID (Logical IDentifier) attached to the message in a header. Every radio in the system has a LID and every LID is unique to its particular radio. In that way, the LID, when it is broadcast with a radio transmission message, identifies the radio that originated the transmission to all recipients of the message.

The personality information can also include a number of different radio attributes including channel frequency sets, a unique radio identifier, encryption keys and radio feature data. Included within the personality information is the concept that different radios may employ different classes of personality, such as a "supervisor" personality, a "manager" radio, an "end-user" radio, etc. for which different radio features, attributes and accesses are provided.

Personality information, including encryption information can now be sent over-the-air to a radio in the field. Encryption keys can also be updated over-the-air using this scheme. For example, when a radio enters a site, the client can program the channel frequency, encryption keys, feature data, etc. into the radio by broadcasting the personality information to the radio via the appropriate gateway/site. In this way, the radio need not be permanently programmed in the factory for use at a particular site, but can be more flexible in its application across different sites.

Problems can arise, however, when the network becomes large, such as can be the case with a large network having multiple sites in multiple cities. When radios roam from city to city, the radios must use different personality information for each different site. But, because the site identifier, channel frequency, feature data, etc. must be entered into that personality information for all possible sites in which the radio may be employed, the size of the personality information file can quickly outgrow the available space in a radio that roams through a large network.

One solution is to use smaller personalities that are more local in nature. In this embodiment, a radio would only be useful in a select one or more sites since it would only hold radio personality information for those local sites. To roam to another site, the radio user would request a new personality with the destination location's site information. This, of course, can be given to the radio over-the-air, but must be done using personnel at the client site in order to handle the user requests for new personalities. Thus, this embodiment eliminates the need to pre-program multiple personality information into the radio for all possible sites into which it will roam, but the client location must employ personnel on stand-by to await requests for new personalities when the radio roams. That is, someone at the client must initiate the reprogramming operations from the client computer.

Ideally, radios could be made to contain only localized personality information, but also be capable of roaming to other sites, without requiring personnel at the client to await the requests to do so. In the present invention, the radio itself is capable of initiating a reprogramming operation on its personality information. In this way, a user can roam to a destination site, and have the radio itself initiate the personality download from the client. The radio then does not need to memorize all possible site personalities, but can memorize only a select one or more personalities at a given time. All other site personalities would be available to the radio by request from the client, without the need for personnel at the client site to await the request and initiate the download.

BRIEF DESCRIPTION OF THE DRAWINGS

These, as well as other objects and advantages of this invention, will be more completely understood and appreciated by careful study of the following more detailed description of a presently preferred exemplary embodiment of the invention taken in conjunction with the accompanying drawings, of which:

FIG. 3 is an alternative prior art data frame through the network layer of the OSI architecture;

FIG. 4 is a prior art client/server mobile radio communication system;

FIG. 5 is a mobile radio communication system with multiple gateways; and

FIG. 6 is a portion of the data layers for a server initiated request for new personality information.

DETAILED DESCRIPTION OF THE PRESENTLY PREFERRED EMBODIMENT

Figure 1:
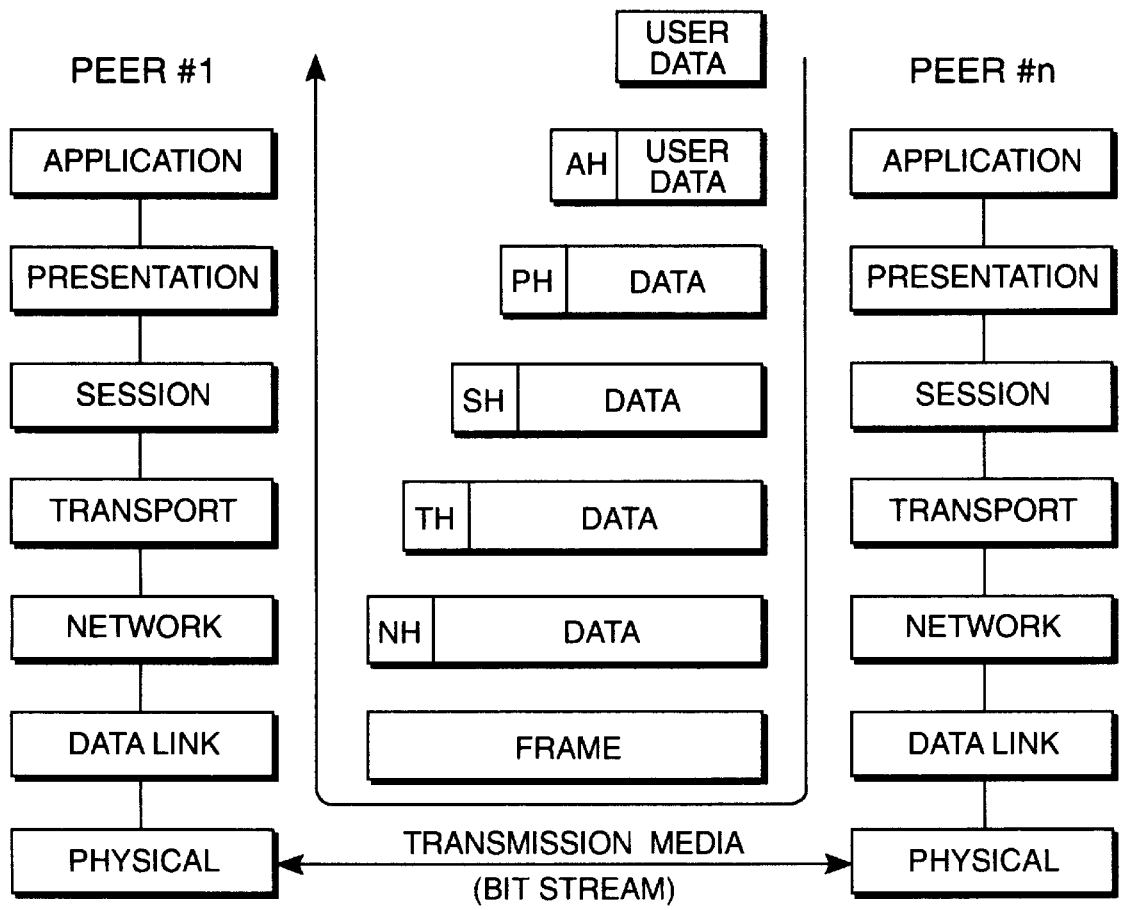
FIG. 1 is a prior art OSI architecture.
Figure 2:
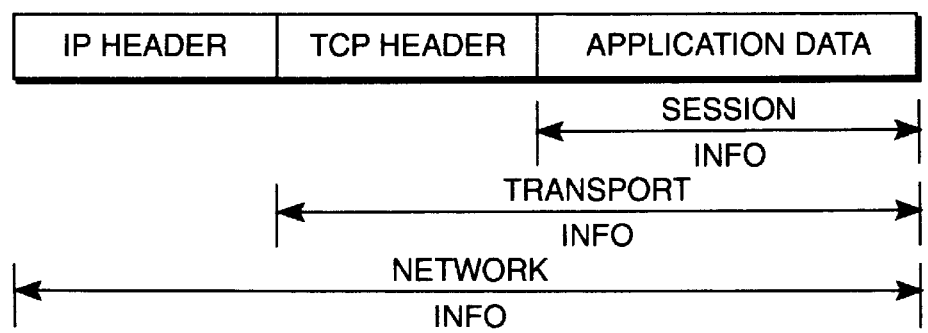
FIG. 2 is a prior art data frame through the network layer of the OSI architecture.

In FIG. 5, a mobile radio communication network is shown operating between three metropolitan cities (A, B, and C). Each city contains, respectively, three sites (A1, A2, A3, B1, . . . C3) transmitting to a corresponding gateway (EDG A [Ericsson Data Gateway A], EDG B, and EDG C) in each city. The gateways, in turn, communicate to the Central Server (EDG Network), which may employ a Personality Server assigned to the task of managing personality information for the many mobile radios used in the communication system. While the embodiment of FIG. 5 is shown in the context of the Ericsson Gateways and Servers, alternative mobile radio gateways or servers can be substituted and still remain within the context of the present invention.

As shown in FIG. 5, a mobile radio may roam, for example, from city A to city B, as the radio user moves correspondingly. In city A, the radio will employ a certain personality information file that permits it to correspond on the proper frequency, with the proper encryption keys, using the appropriate radio features, etc. for that radio in that site. When the radio then roams to city B, the personality information must change.

Originally, a radio will be programmed with personality information for its particular class and home city. Also, the radio will be programmed to know which other cities are available to which the radio may roam. When the radio travels from its home city to a destination city, the radio user selects a destination city from a menu of possible destination cities. Thus, for example, considering FIG. 5, if the radio's home city is City A, the radio's menu will normally list City B and City C as possible destination cities.

When the radio is ready to roam from city A to city B, the radio initiates a request to the central personality server for new personality information by sending its request with destination city to the IP address and UDP port number of the central personality server (FIG. 5). The server then builds a personality from the radio's LID, destination city and personality type. The data structure for the personality request can look like that shown in FIG. 6.

In FIG. 6, the personality server has assembled the "ProFile Manager Request" from the origination city for the radio (Old Location), the destination city (New Location) and the personality class (Personality Type) for the requesting radio. The UDP Header is required in order to identify the port number for the appropriate Server Initiated Request listener to which the personality information request is directed. That is, one server may be servicing several listeners, including assigned gateways, so the UDP header identifies the request as directed to one particular listener. The IP Header identifies the roaming radios. The Server fills this in automatically after having read the radio IP address from the communication from the radio to the server requesting the new personality information.

Each EDG stores a map of the IP/LIDs for each of the radios in its service area. Thus, the radio shown in FIG. 5, while it remains in city A, has its IP/LID stored by EDG A in a memory map contained in the EDG A. Each EDG memory map also includes a number of additional, roaming LIDs. That is, each radio having city A as its home city has its IP/LID stored by EDG A as a permanent LID, but additional LIDs are available from EDG A that are not permanently assigned to any particular radio. Those unassigned LIDs are available for issuance to radios that roam into city A serviced by EDG A, hence they are referred to as "roaming LIDs."

The EDGs keep track, in the memory map, of all permanently assigned LIDs, each roaming LID that has been assigned, and each roaming LID that has is available to be assigned. When a radio asks to roam into a new city, the EDG servicing that city (or area) issues an available roaming LID from its memory map to the radio. It does this by responding to the Server Initiated Request (FIG. 6) with a response including the roaming LID to be given to the radio. Thus, for the FIG. 5 example, the radio in city A has a personality information file that it uses in city A until it requests to roam to city B. Then, the roaming radio sends a request to the personality server seeking a new personality information file for city B. The personality server then sends a FIG. 6 Request to EDG B (in city B). EDG B sends back a roaming LID from its list of available roaming LIDs to the personality server. EDG B then removes the issued roaming LID from its available roaming LIDs.

After receiving the radio request (FIG. 6), the personality server thus sends a request to the destination city gateway asking for a roaming LID. After receiving the roaming LID, the server builds a personality file from the radio's LID, destination city, and personality type.

The personality server after preparing the new personality information including the roaming LID given to it by EDG B, initiates a communication session with the radio. In the communication session, the personality server provides the radio with the new personality information that it can use when it arrives in city B. The radio stores the new personality information and uses it to communicate in accordance with the features and specifications relevant to the broadcast characteristics of city B (and EDG B) and the features of the radio class.

Note that the radio updates its menu to list city A and city C as the only available destination cities, once the radio receives the new personality information for city B. The server also memorizes the original personality file (for city A) that the radio had previously used, so the personality information is readily available to the radio when it returns to city A. In order to receive the original personality information (for city A), the radio requests a return to city A from city B. The personality server receives the request, re-creates the original personality information using the stored LID for the radio (for city A), and broadcasts that information to the radio. The personality server then notifies EDG B that the roaming LID that EDG B issued for the radio is now free to be re-issued. In this way, roaming LIDs are tied up only as long as they are in use by a radio in a given EDG area.

Since the radio is home-based in city A, its LID in city A is permanently assigned to it—and EDG A will not re-allocate it while the radio is absent from city A.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A broadcast communication system, comprising:

a plurality of gateways, each assigned to corresponding regions;

a plurality of mobile radios distributed among the corresponding regions and being in communication with at least one gateway, the radios each including a memory for storing personality information including a unique identifier, the personality information permitting the radio to communicate with other mobile radios in a corresponding region assigned to the gateway, and a transmitter for transmitting requests to a personality server for new personality information including a new unique identifier, said new personality information corresponding to a different region assigned to a different gateway;

a receiver for receiving the new personality information from the personality server and transferring the new personality information to the memory for storage; and wherein the memory further stores a list of different regions, and wherein the radio further includes a display unit to display the list and an input unit to permit a radio user to select a different region from the list; and wherein each gateway includes:

a memory map to store the personality information for each radio in a corresponding region, to store new personality information for roaming radios that later enter the corresponding region, and to map the personality information and new personality information to the radios and roaming radios, respectively, in the corresponding region, and a communication transmitter to provide a new personality information from the memory map to a roaming radio when the roaming radio requests entrance into a corresponding region such that the roaming radio communicates in the corresponding region using the new personality information.

2. A broadcast communication system according to claim 1, wherein:

the plurality of gateways communicate with the personality server; and the gateways transmit the unique identifiers to the roaming radios through the personality server.

3. A broadcast communication system according to claim 1, wherein:

the memory map of each gateway further tracks when additional identifiers are available for use by roaming radios requesting entrance into a corresponding region.

4. A broadcast communication system according to claim 2, wherein:

the server communicates to each gateway when a roaming radio having an assigned additional identifier leaves a corresponding region, and wherein the memory map of the gateway in the corresponding region then frees the assigned additional identifier for a new roaming radio that requests entrance into the corresponding region.

5. A broadcast communication system according to claim 2, wherein the gateways communicate with the personality server via a network connection.

6. A broadcast communication system according to claim 5, wherein the gateways communicate with the personality server via the Internet.

7. A mobile radio communicating with a personality server via gateways, comprising:

a memory for storing personality information including a unique identifier, the personality information permitting the radio to communicate with other mobile radios in a corresponding region assigned to the gateway, and for storing a list of different regions a transmitter for transmitting requests to the personality server for new personality information including a new unique identifier, said transmitter providing said request by a self-initiated process, said new personality information corresponding to a different region assigned to a different gateway;

a receiver for receiving the new personality information from the personality server and transferring the new personality information to the memory for storage such that the mobile radio communicates in the different region using the new personality information;

display unit to display the list of different regions; and an input unit to permit a radio user to select a different region from the list of different regions.

8. A mobile radio according to claim 7, wherein the transmitted request includes information identifying the different region and wherein the receiver receives the new unique identifier from the different gateway via the personality server.

9. A mobile radio communicating with a personality server via gateways, comprising:

a memory for storing personality information including a unique identifier, the personality information permitting the radio to communicate with other mobile radios in a corresponding region assigned to the gateway, and a transmitter for transmitting requests to the personality server for new personality information including a new unique identifier, said new personality information corresponding to a different region assigned to a different gateway;

a receiver for receiving the new personality information from the personality server and transferring the new personality information to the memory for storage; and wherein the memory further stores a list of different regions, and wherein the radio further includes a display unit to display the list and an input unit to permit a radio user to select a different region from the list.

10. A mobile radio according to claim 9, wherein the radio transmitter transmits the request in response to the selection of a different region and wherein the receiver receives the new personality information from the personality server including the new unique identifier from the corresponding different gateway.

11. A method of reprogramming a mobile radio that roams from a first region monitored by a first gateway to a different region monitored by a second gateway through a personality server, comprising the steps of:

(1) issuing a first unique identifier for the mobile radio for use in the first region and issuing personality information for the mobile radio for use in the first region;

(2) storing the personality information including the unique identifier in a memory of the mobile radio, the personality information permitting the radio to communicate with other mobile radios in a corresponding region assigned to the first gateway, and (3) broadcasting from the mobile radio in the first region using the first unique identifier;

(4) storing in the memory of the mobile radio a list of different regions;

(5) displaying the list at the mobile radio;

(6) providing an input unit to permit a user of the mobile radio to select a different region from the list;

(7) transmitting requests from the mobile radio to the personality server for new personality information including a new unique identifier, said new personality information corresponding to the selected different region assigned to the second gateway;

(8) issuing from the personality server a second unique identifier for the mobile radio for use in the selected different region and issuing new personality information for the mobile radio for use in the selected different region;

(9) receiving the new personality information from the personality server at the mobile radio and transferring the new personality information to the memory for storage;

(10) moving the mobile radio from the first region to the selected different region; and

(11) broadcasting from the mobile radio in the selected different region using the second unique identifier and new personality information.

12. A method according to claim 11, wherein step 8 further includes:

8A) broadcasting a request for the second unique identifier from the personality server to the second gateway;

8B) broadcasting the second unique identifier from the second gateway to the personality server;

8C) compiling the new personality information in the personality server using the second unique identifier; and 8D) broadcasting the new personality information to the mobile radio.

13. A method according to claim 11, further including steps:

12) storing the first unique identifier and personality information in the personality server;

13) roaming the mobile radio back to the first region;

14) broadcasting the first unique identifier and personality information from the personality server; and 15) broadcasting from the mobile radio in the first region using the first unique identifier and personality information.

14. A method according to claim 11, wherein step:

1) further includes:

1A) mapping a first list of unique identifiers at the first gateway and issuing one such unique identifier from the first list to the mobile radio for use in the first region; and 8) further includes:

8A) mapping a second list of other unique identifiers at the second gateway and issuing one such unique identifier from the second list to the mobile radio for use in the second region.

15. A method according to claim 14, wherein step:

1A) further includes mapping first permanent unique identifiers and first roaming unique identifiers and issuing one such first permanent unique identifier to the mobile radio for use in the first region; and 8A) further includes mapping second permanent unique identifiers and second roaming unique identifiers and issuing one such second roaming unique identifier to the mobile radio for use in the second region.

* * * * *